United States Patent [19]
Palm

[11] 4,404,801
[45] Sep. 20, 1983

[54] METHOD OF GENERATING ENERGY FROM DIFFERENT WATER LEVELS

[76] Inventor: Dieter Palm, Kopernikusstrasse 60, 6800 Manheim 1, Fed. Rep. of Germany

[21] Appl. No.: 96,511

[22] Filed: Nov. 21, 1979

[51] Int. Cl.³ .............................................. F03C 5/00
[52] U.S. Cl. ........................................ 60/496; 60/495
[58] Field of Search ................... 60/495, 496, 398, 639

[56] References Cited

U.S. PATENT DOCUMENTS 1,550,408  8/1925  Witt ....................................... 60/496

FOREIGN PATENT DOCUMENTS 997241  1/1952  France .
188788  11/1922  United Kingdom .................. 60/496

Primary Examiner—Allen M. Ostrager
Assistant Examiner—Stephen F. Husar
Attorney, Agent, or Firm—Staas & Halsey

[57] ABSTRACT

Apparatus and method of obtaining energy, preferably electrical energy, from different water levels effected by a container resting on a float to be filled from an upper water level of the different water levels via lateral, inwardly opening, flat valves which permit entry of water into the container as it sinks under the weight thereof, and discharge ports for permitting egress of the water while the container is being raised, the discharge ports being closed during the filling process and opened after a desired level of the container is achieved, the discharge ports being arranged in the lower end of the container, and the container resting on a float therebeneath which compensates for the net weight of the cont

8 Claims, 5 Drawing Figures

METHOD OF GENERATING ENERGY FROM DIFFERENT WATER LEVELS

BACKGROUND AND SUMMARY OF THE INVENTION

The invention relates to a method of generating energy, more particularly electrical energy, from differing water levels, wherein a container resting upon a float is filled from the upper water level through inwardly opening side flaps while descending, and is drained through outlet openings while being lifted.

A container has become known through French Pat. No. 997,241, which rests upon a float and is provided with inwardly opening side flaps. This container is filled with water through waves through inwardly opening side flaps. The water thus captured in the container serves to drive turbines on the bottom of the container. This mode of operation is particularly disclosed at page 3, left-hand column of French Pat. No. 997,241. This patent describes, among other things, that the container goes down under the weight of the captured water. Because of this descent of the container, it becomes possible for the waves rushing into the inwardly opening side flaps to feed more water to the interior of the container, thereby increasing the amount of water being drained by means of turbines. The draining of this container is an inevitable result of a lifting operation.

By means of this apparatus disclosed in French Pat. No. 997,241, it is possible to generate energy through the use of the turbines. However, the filling height that can be utilized, that is to say, the pressure of the water being carried on the turbines, is limited by the height of the waves rushing into the inwardly opening side flaps. Furthermore, it is not possible with the above apparatus to generate energy from two constantly differing water levels.

It is therefore an object of the invention to provide a method as well as an apparatus permitting the use of the energy of waves having a small height or of two constantly differing water levels having a very small difference in height.

For this purpose, instead of the turbines described in French Pat. No. 997,241, only one or more draining cross sections are pinpointed and cleared when the container has reached a desired (e.g., maximum) filling level. The rising and descending movement of the container may, for example, be converted into a continuous rotary movement by means of a connecting rod and crankshaft.

According to the invention, the problem is solved by filling through variable side flaps a container of any size mounted on a float fixedly connected with the container. Due to the increasing water volume, the container descends with the float to a certain filling volume. This linear descending movement is converted into a rotary movement by means of suitable transmission devices, such as gears, and can be used to generate power.

When the container has reached a maximum filling level, e.g. the lowest point of descent, a draining section is cleared by the filling flaps described above or by additionally arranged draining flaps.

Due to the buoyancy of the float located under the container, the latter moves upwards again. This movement, too, can be used to generate energy.

Differences between the water levels have already been utilized by means of water wheels or water turbines, but relatively great water level differences are needed here.

One of the advantages achieved by the invention lies in the fact that maximum energy utilization can be achieved even with small water level differences, because according to the invention the container can also be filled through the variable flaps with a small feeding height, while by closing the flaps and lowering the container a filling level of any height and only limited by the height of the container and, thereby, a correspondingly high height of lift can be achieved. Thus, with the method and apparatus according to the invention, a height of lift can be achieved which is independent of the difference in water levels to be utilized.

A continuously adjustable energy generation can be achieved by joining in parallel or arranging in series a plurality of containers. The buoyancy of the float on which the container rests can be so selected that the lower edge of the empty container lies a certain distance x above the lower water level.

The upper end of the container embodying the principles of the invention may also be provided with an auxiliary container separated therefrom. This auxiliary container has at the bottom a laterally arranged closable outlet opening. This auxiliary container can be filled independently of the container itself from an upper water level, e.g., from a pumped storage container as in a pump-fed power station. In this way, it is possible to use a higher water level to generate energy, in addition to the small water level differences between a lower water level and an upper water level.

The method according to the invention will now be described with reference to the following figures, wherein:

DESCRIPTION OF THE PREFERRED EMBODIMENT

Figure 1:
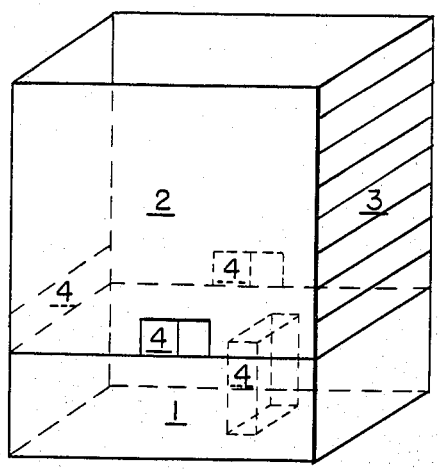
FIG. 1 is a perspective, schematic view of an apparatus embodying the principles of the invention.

FIG. 1 is a perspective view of an apparatus according to the invention to carry out the method according to the invention, wherein reference numeral 1 identifies the float and reference numeral 2 the container disposed on the float. Schematically shown on one of the sides of the container are flaps (3) through which the container can be filled with water. One possible form of construction for such flaps is, for example, described in French Pat. No. 996,241 referred to above, particularly in FIG. 5. Though the container may also be emptied through the side flaps (3) namely by opening these openings, in one embodiment the container has outlet openings (4) that can be closed at the bottom. As apparent from FIG. 1, these outlet openings (4) may be arranged as an independent unit directly above the bottom of the container, but they may also be carried downwards through the float (1) on the container bottom itself. Both possibilities are shown in FIG. 1.

Figure 2:
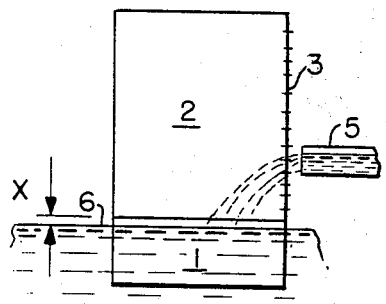
FIG. 2 shows the filling of the container through the side flaps.

FIG. 2 shows how the container (2) is filled with water from an upper water level (5). The water rushes in from the upper water level (5) through the side flaps (3) into the container (2) resting upon the float (1). When the container is empty, its lower edge is located a distance x above the lower water level (6).

Figure 3:
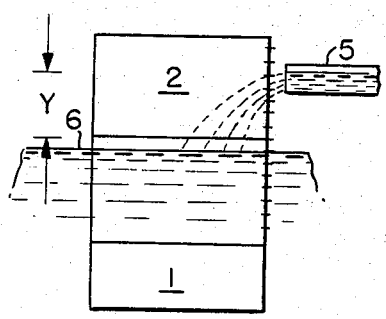
FIG. 3 shows a half-filled container.

In FIG. 3, the container (2) is half-filled. For clarification purposes, the difference between the upper water level (5) and the lower water level (6) is labeled y and drawn in as a difference in height.

Figure 4:
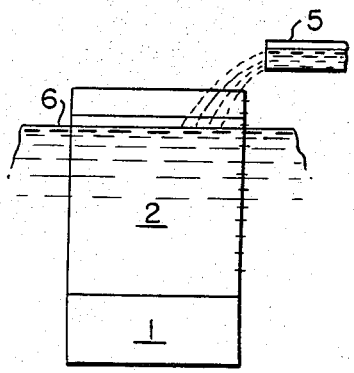
FIG. 4 shows an almost completely filled container.

Finally, in FIG. 4 the container (2) is almost completely filled.

In the method according to the invention and as shown in FIG. 4, for example, the container is drained by opening the outlet openings (4). However, the container may also be drained through the side flaps (3) by opening the same. Since the water can exit from the container (2), the container itself is pressed upwards by the buoyancy of the float (1). Both the descending motion caused by the filling of the container (2) and the rising motion are used to generate energy. This may be done with a connecting rod and crankshaft.

Figure 5:
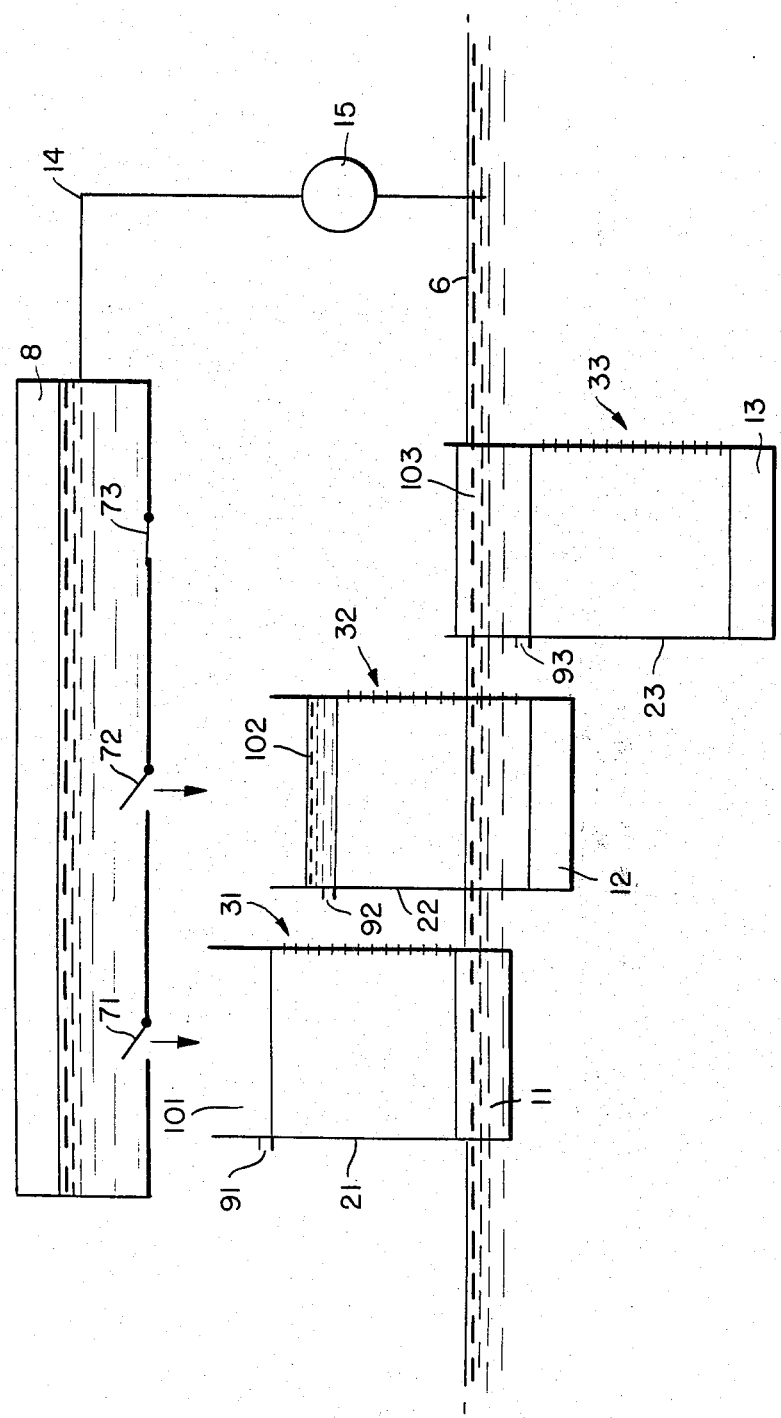
FIG. 5 shows three containers joined in parallel in side by side relation, each provided with an auxiliary container.

FIG. 5 shows three containers (21, 22, 23) joined in parallel and each provided with an auxiliary container (101, 102, 103) disposed thereabove. The method according to the invention and the apparatus used to carry it out will be described below.

The left auxiliary container (101) is filled through the open left valve (71) from the upper water tank (8). During the filling, the outlet opening of the left auxiliary container (91) is closed. As a result, the left container (21 on the float of the left container (11) goes down. Further, the left container (21) is filled by waves or the like from another upper water level (5) if necessary (FIGS. 2, 3, 4). Thus, the downward movement of the container is continued. This is shown in the middle portion of FIG. 5. Here, too, the middle auxiliary container (102) continues to be filled from the upper water tank (8) through the middle valve (72). The middle auxiliary container (102) is shown as partly filled. Meanwhile, the outlet opening of the middle auxiliary container (92) remains closed. The middle container (22) on the float of the middle container (12) continues to go down; the downward movement is further promoted by the filling of the middle container (22) through the flaps (32) of the middle container (32). Finally, the container and the auxiliary container have gone down all the way. This is shown in the right-hand portion of FIG. 5. According to the invention, the right valve (73) above the right auxiliary container (103) is closed when the latter is nearly filled together with the right container (23) which has gone down below the water surface. Then, according to the invention, the outlet opening (93) of the right auxiliary container (103) is opened, so that, due to the buoyancy of the float of the right container (13), a lifting motion is initiated. The flaps (33) of the right container (23) can then also be opened so that water can also exit from the right container (23) until the right container (23), together with the right auxiliary container (103), has risen completely above the water surface. This situation is apparent from the left-hand side of FIG. 5. The cycle can now be repeated. However, this cycle can advantageously be run in several, more particulary three, parallel-connected containers, as shown in FIG. 5. The upper water tank (8) can be filled from the lower water level (6) by a pump-fed power station via the water conduit (14) through the pump (15).

While the invention has been described and illustrated in its several preferred embodiments, it should be understood that the invention is not to be limited to the precise details herein illustrated and described, since the same may be carried out in other ways falling within the scope of the invention as claimed.

The method described in FIG. 5 may also be carried out with the flaps (31, 32, 33) of the containers (21, 22, 23) always open. In this case, energy is generated by lowering and raising the auxiliary containers (101, 102, 103) which are filled through the valves (71, 72, 73).

I claim:

1. A method of generating energy, more particularly electrical energy, from differing water levels, comprising the steps of: filling a container resting upon a float while descending from an upper water level of the differing water levels through inwardly opening side flaps, wherein the outlet openings are closed during the filling; draining the container while rising through outlet openings opened upon reaching a desired filling level; and generating energy through movement of the container during the filling and draining of the container.

2. Apparatus for generating energy comprising: a container having side flaps and closable outlet openings arranged at the lower end of the container, said container resting upon a supporting float, which compensates for the intrinsic weight of the container; means for filling and draining said container with water; and means for generating energy through movement of the container during filling and draining of said container.

3. Apparatus according to claim 2, wherein said outlet openings arranged at the lower end of the container include outlet opening on the bottom of the container which is carried downward through the float.

4. Apparatus for generating energy comprising: a container having side flaps and closable outlet openings arranged at the lower end of the container, said container resting upon a supporting float, which compensates for the intrinsic weight of the container; an auxiliary container disposed on the upper side of the container and having on its lower end an outwardly pointing closable outlet opening; means for filling and draining said auxiliary container with water; and means for generating energy through movement of said container during filling and draining of said auxiliary container.

5. Apparatus according to claim 4, wherein three containers are joined in parallel with one another in side by side relation.

6. Apparatus according to claim 5, wherein there is disposed above each auxiliary container a valve, from which the auxiliary container is to be filled.

7. Apparatus according to claim 6, wherein after filling the container and the auxiliary container through the valve located thereabove, said outlet opening of the auxiliary container remaining closed, said outlet opening is opened and the side flaps of the container are then opened, so that the container and the auxiliary container can again rise above the water surface.

8. Apparatus for obtaining energy from different water levels comprising: (a) a container resting on a float to be filled from an upper water level of said different water levels via lateral, inwardly opening, flap valves while being lowered, and is emptied through discharge ports while being raised, wherein said discharge ports are closed during the filling process and are opened when a desired level is reached, said container being provided with side flap valves and closable discharge ports arranged in the lower end of said container, said container resting on a float which compensates for the net weight of said container, and at least one of said discharge ports being on the bottom of said container and being passed downwardly through said float; (b) means for filling and draining said container with water; and (c) means for generating energy through movement of said container during the filling and emptying of said container.

* * * * *